US011321720B2

(12) United States Patent
Bennett

(10) Patent No.: US 11,321,720 B2
(45) Date of Patent: May 3, 2022

(54) SYSTEMS AND METHODS FOR GENERATING CONSUMPTION PROBABILITY METRICS

(71) Applicant: Rovi Guides, Inc., San Jose, CA (US)

(72) Inventor: Steven Bennett, Somerville, MA (US)

(73) Assignee: Rovi Guides, Inc., San Jose, CA (US)

( * ) Notice: Subject to any disclaimer, the term of this patent is extended or adjusted under 35 U.S.C. 154(b) by 49 days.

(21) Appl. No.: 17/023,587

(22) Filed: Sep. 17, 2020

(65) Prior Publication Data

US 2021/0004842 A1    Jan. 7, 2021

Related U.S. Application Data

(63) Continuation of application No. 15/639,088, filed on Jun. 30, 2017, now Pat. No. 10,810,602.

(51) Int. Cl.

| | |
|---|---|
| *H04N 21/442* | (2011.01) |
| *G06Q 30/02* | (2012.01) |
| *H04H 60/33* | (2008.01) |
| *H04N 21/658* | (2011.01) |
| *H04H 60/47* | (2008.01) |
| *H04N 21/258* | (2011.01) |
| *H04H 60/43* | (2008.01) |
| *H04N 21/81* | (2011.01) |
| *H04H 60/46* | (2008.01) |
| *H04H 60/02* | (2008.01) |

(52) U.S. Cl.
CPC .......... *G06Q 30/02* (2013.01); *H04H 60/33* (2013.01); *H04H 60/43* (2013.01); *H04H 60/46* (2013.01); *H04H 60/47* (2013.01); *H04N 21/25891* (2013.01); *H04N 21/44222* (2013.01); *H04N 21/6582* (2013.01); *H04N 21/812* (2013.01); *H04H 60/02* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward et al. |
| 7,165,098 B1 | 1/2007 | Boyer et al. |

(Continued)

*Primary Examiner* — Omar S Parra
(74) *Attorney, Agent, or Firm* — Haley Guiliano LLP

(57) ABSTRACT

A consumption probability metric may be generated for a media asset. An aggregated forecast predicting user consumption of a media asset is received. A plurality of probabilities, each corresponding to a user of a plurality of users, is received, each indicating how likely a respective user is to consume the media asset. A weight for the plurality of users is calculated representing a ratio of the total number of users to a number of users in the plurality of users. A disaggregated forecast predicting user consumption of a media asset is determined based on the weight for the plurality of users and the plurality of probabilities. A modification factor is computed based on the aggregated forecast and the disaggregated forecast. A metric is generated that includes a plurality of user identifiers associated with the plurality of users and a plurality of modified probabilities each modified by the modification factor.

20 Claims, 6 Drawing Sheets

(56) References Cited

U.S. PATENT DOCUMENTS

| | | |
|---|---|---|
| 7,383,243 B2 | 6/2008 | Conkwright et al. |
| 7,761,892 B2 | 7/2010 | Ellis et al. |
| 8,046,801 B2 | 10/2011 | Ellis et al. |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2008/0263578 A1 | 10/2008 | Bayer et al. |
| 2010/0153885 A1 | 6/2010 | Yates |
| 2010/0191689 A1* | 7/2010 | Cortes .................. G06F 16/783 706/46 |
| 2018/0124444 A1* | 5/2018 | Van Zwol .......... H04N 21/4668 |
| 2018/0137541 A1 | 5/2018 | Yelton et al. |

* cited by examiner

| | User 1 | User 2 | User 3 | User 4 |
|---|---|---|---|---|
| 102 | User 1 | User 2 | User 3 | User 4 |
| 104 | .6 | .4 | .7 | .3 |

100

| | User 1 | User 2 | User 3 | User 4 |
|---|---|---|---|---|
| 152 | User 1 | User 2 | User 3 | User 4 |
| 154 | .75 | .5 | .875 | .375 |

SYSTEMS AND METHODS FOR GENERATING CONSUMPTION PROBABILITY METRICS

CROSS-REFERENCE TO RELATED APPLICATION

This application is a continuation of U.S. patent application Ser. No. 15/639,088, filed Jun. 30, 2017. The disclosure of which is hereby incorporated by reference herein in its entirety.

BACKGROUND

Various parties have the need to accurately predict a number of users that will consume a specific program. For example, a corporation may desire to reach as wide of an audience as possible (e.g., with an advertisement). Various ways currently exist to predict a number of users that will consume a specific program. For example, some providers monitor user equipment devices in various households in order to identify channels that the user equipment devices are tuned to, and based on this information, extrapolate an approximate number of users that consumed a particular program or channel. From that information, these providers can predict a number of people that will consume a future program. However, these providers are not able to efficiently predict cross-sections of users (e.g., users having specific preferences and/or characteristics) that will consume the media asset. Furthermore, these systems may not be able to accurately predict a number of unique users that will consume a specific set of media assets as well as the number of times a user may be exposed to multiple media assets, for example, in an advertisement campaign.

SUMMARY

Therefore, systems and methods are disclosed herein for generating consumption probability metrics for media assets. The consumption probability metrics are used in a unified forecasting approach. This approach combines aggregated metrics (e.g., national ratings) and disaggregated viewership (e.g., user-level probabilities of viewing content) to determine viewership of a specific user-defined target (e.g., users that like trucks) and reach (e.g., unique number of users that will consume a specific media asset).

In some aspects, a consumption probability metric may be generated for a media asset. A first value representing a first number of users that are predicted to consume a media asset is received, the value being a portion of a total number of users (e.g., aggregated forecast). A plurality of probabilities, each corresponding to a user of a plurality of users, is received, each of the received probabilities indicating how likely a respective user is to consume the media asset. A weight for the plurality of users is calculated, the weight representing a ratio of the total number of users to a number of users in the plurality of users. A second value representing a second number of users that are predicted to consume the media asset is determined (e.g., disaggregated forecast) based on (1) the weight for the plurality of users and (2) the plurality of probabilities. A modification factor is computed based on the first number of users and the second number of users. A metric is generated that includes (1) a plurality of user identifiers associated with the plurality of users and (2) a plurality of modified probabilities, each modified probability of the plurality of modified probabilities modified by the modification factor.

A viewership forecasting application may be used to perform the actions described with respect to generating the consumption probability metrics. The viewership forecasting application may reside on one or more devices and may be accessed from those devices, as well as other connected devices.

In some embodiments, the viewership forecasting application may receive a prediction of a number of users that will consume a media asset (e.g., a number of households of a total population of households that are monitored for media consumption activity). Specifically, the viewership forecasting application may receive a first number of users that are predicted to consume a media asset, where the first number of users is a portion of a total number of users. For example, the viewership forecasting application may receive from a provider such as The Nielsen Company information that indicates that ten million out of one hundred million households are predicted to view an episode of the show "The Big Bang Theory."

The viewership forecasting application may have access to one or more sources of information that includes a plurality of user profiles associated with a plurality of users, respectively. The user profile information may include user preference information that may be used to determine a probability that a particular user will consume a particular media asset. The viewership forecasting application may retrieve the probabilities. Specifically, the viewership forecasting application may retrieve a plurality of probabilities, each corresponding to a user in a plurality of users, where each probability indicates how likely a respective user is to consume the media asset. In some embodiments, the viewership forecasting application may retrieve the user profiles and calculate the probabilities based on information (e.g., user preferences and characteristics) stored in the profiles.

The viewership forecasting application may calculate a weight for the plurality of users based on the ratio of the number of users in the plurality of users to the total number of users (e.g., a total population of households that are monitored for media consumption activity). Specifically, the viewership forecasting application may calculate a weight for the plurality of users, where the weight represents a ratio of the total number of users to a number of users in the plurality of users. For example, if the total number of users in the population is 100,000 and the number of users in the plurality of users is 100, each user in the plurality of users will have a weight of 1,000 (i.e., 100,000 divided by 100).

The viewership forecasting application may determine a second number of users that are predicted to consume the media asset (e.g., disaggregated forecast). The viewership forecasting application may use the weight for the plurality of users, the number of users in the first plurality of users, and the plurality of probabilities to make the determination. Specifically, the viewership forecasting application may determine, based on (1) the weight for the plurality of users and (2) the plurality of probabilities, a second number of users that are predicted to consume the media asset. For example, the viewership forecasting application may retrieve for each in the plurality of users a corresponding probability and calculate a sum of all the probabilities. The viewership forecasting application may determine the product of the sum and weight for the plurality of users to arrive at the second number of users.

The viewership forecasting application may compute a ratio between the first number of users and the second number of users, thereby identifying a ratio of the aggregated forecast to disaggregated forecast. Specifically, the viewership forecasting application may compute, based on the first number of users and the second number of users, a modification factor for the first media asset. For example, the viewership forecasting application may divide the first number of users by the second number of users.

The viewership forecasting application may generate a metric based on the plurality of probabilities using the modification factor. Specifically, the viewership forecasting application may generate, for the media asset, a metric comprising (1) a plurality of user identifiers associated with the plurality of users and (2) a plurality of modified probabilities, where each modified probability of the plurality of modified probabilities is modified by the modification factor. For example, the viewership forecasting application may multiply each probability by the modification factor and store the result as part of the metric. The generated metric may be referred to as consumption probability metric.

In some embodiments, the viewership forecasting application may use the generated consumption probability metric to forecast viewership of a cross-section of users (e.g., users that are known to enjoy chocolate products). Specifically, the viewership forecasting application may receive a characteristic associated with a group of users (e.g., enjoyment of chocolate). The viewership forecasting application may compare the characteristic with each of a plurality of profiles associated with the plurality of users and select, based on the comparing, a set of user identifiers from the plurality of user identifiers corresponding to those profiles that match the characteristic. The viewership forecasting application may determine, using a portion of the metric associated with the set of user identifiers, an amount of users that are likely to consume the media asset.

For example, an advertiser may be considering running an advertisement for a chocolate candy. It would be useful for the advertiser to know how many users that are known to like chocolate are predicted to watch a specific show. Thus, enjoyment of chocolate may be a characteristic that is compared with the data in the user profiles and based on the number of profiles that match that characteristic, the viewership forecasting application may determine the number of viewers that enjoy chocolate that are predicted to watch a specific show. Those numbers may be compared with the numbers for other shows in order to choose the show during which the advertisement will be played.

In some embodiments, the viewership forecasting application may determine the amount of users that are likely to consume the media asset using the following actions. The viewership forecasting application may calculate a sum of modified probabilities that are associated with the portion of the user metric and multiply the sum by the weight. For example, if there are five users in the plurality of users with the modified probabilities of 0.6, 0.7, 0.4, 0.3, and 0.5 and the weight of each user is twenty million, the viewership forecasting application may calculate a sum of all the probabilities (i.e., 2.5) and multiply the sum by the weight (i.e., 25 million) to arrive at the result of 62.5 million users.

In some embodiments, the viewership forecasting application may determine a number of unique users that are likely to consume an advertisement associated with a specific advertiser using the generated consumption probability metric. Specifically, the viewership forecasting application may receive, from an advertiser, a value representing a number of advertisements associated with the advertiser that are to be played during presentation of the media asset and determine, based on (1) the value representing the number of advertisements and (2) the plurality of modified probabilities and (3) the weight, a number of unique users that are likely to consume any advertisement that is both (1) associated with the advertiser and (2) is to be played during the presentation of the media asset.

For example, for each user, the viewership forecasting application may retrieve the modified probability (e.g., 0.4) and subtract that number from one. The result of the subtraction operation (e.g., 0.6) is raised to the power equal to the number of advertisements associated with the advertisers that are run during the media asset (e.g., 0.6 raised to the power of two equals 0.36). This value is subtracted from one (e.g., one minus 0.36 equals 0.64). These actions determine a probability that a user consumed at least one advertisement of two advertisements associated with the advertiser that ran during the media asset. The viewership forecasting application may multiply the resulting probability by the weight to determine the probability that a unique user will consume at least one advertisement run within the media asset considered in the calculation (e.g., 0.64 multiplied by 25 million from the example above to arrive at the value of 16 million). The viewership forecasting application may make a similar determination for all users that are being considered and calculate a sum of the result to determine how many unique users are predicted to consume an advertisement (i.e., determine reach). It should be noted that these values may be calculated over a plurality of media assets (e.g., media assets in an advertising campaign).

In some embodiments, the viewership forecasting application may determine the average number of advertisement exposures per user. Specifically, the viewership forecasting application may determine based on the total number of users and the number of unique users that are likely to consume any advertisement associated with the advertiser a number of times that each user consumed an advertisement that is associated with the advertiser. For example, if the number of unique users that are predicted to consume an advertisement is 50 million out of 100 million who actually consumed the media asset, the viewership forecasting application may calculate the number of times on average each user consumed an advertisement as two (i.e., 100 million divided by 50 million).

In some embodiments, the viewership forecasting application may receive the first number of users that are predicted to consume the media asset with the following actions. The viewership forecasting application may receive a media asset identifier associated with the media asset. The viewership forecasting application may transmit, to an audience measurement provider, a request for the first number of users that are predicted to consume the media asset, where the request includes the media asset identifier, and receive, in response to the request, the first number of users that are predicted to consume the media asset. For example, a user may provider the viewership forecasting application with a media asset identifier for consumption probability metric generation. The viewership forecasting application may transmit the media asset identifier to an audio measurement service (e.g., Nielsen Company) and receive back a number of users (e.g., ten million) predicted to consume the media asset associated with the media asset identifier.

The viewership forecasting application may receive the plurality of probabilities with the following actions. The viewership forecasting application may select a service that stores a plurality of profiles associated with the plurality of users and transmit, to a profile server associated with the service, a request for the plurality of probabilities, the request including the media asset identifier. The viewership forecasting application may receive, in response to the request, the plurality of probabilities. For example, the viewership forecasting application may select a service storing user viewership data (e.g., anonymized data originally derived from providers like Netflix®, Hulu®, or another suitable provider). The viewership forecasting application may select a provider based on a number of users for which profiles exist, the amount of data in those profiles, or another suitable criterion. In some embodiments, the viewership forecasting application may select multiple providers. The viewership forecasting application may transmit a request for the plurality of probabilities.

For example, the viewership forecasting application may transmit a media asset identifier associated with the media asset requesting probability for each user consuming the media asset and receive in response the appropriate probabilities. In some embodiments, the viewership forecasting application may receive a plurality of user profiles and, based on an algorithm, determine a probability of each user associated with a corresponding profile consuming the media asset.

In some embodiments, the viewership forecasting application may determine, based on (1) the weight for the plurality of users and (2) the plurality of probabilities, the second number of users that are predicted to consume the media asset with the following actions. The viewership forecasting application may compute a sum of the plurality of probabilities and multiply the sum of the plurality of probabilities by the weight. For example, if there are a total of one hundred users in the plurality of users and each represents one million users (e.g., weight of one million) and the probabilities of the one hundred users add up to twenty-five, the viewership forecasting application may calculate the second number of users that are predicted to consume the media asset by multiplying twenty-five by one million (e.g., resulting in a value of twenty-five million).

In some embodiments, the viewership forecasting application may compute the modification factor for the first media asset by dividing the first number of users by the second number of users. For example, if a Nielsen rating for a media asset is predicted to be twenty million users of one hundred million users (aggregated forecast) and the number of users determined from the plurality of probabilities is twenty-five million users, the modification factor may be calculated as twenty-five million divided by twenty million (i.e., 1.25).

In some embodiments, the viewership forecasting application may generate, for the media asset, the metric comprising (1) a plurality of user identifiers associated with the plurality of users and (2) a plurality of modified probabilities with the following actions. The viewership forecasting application may select a first probability of the plurality of probabilities and compute a product of the first probability and the modification factor. The viewership forecasting application may store, in a data structure associated with the metric, the product of the first probability and the modification factor and the user identifier associated with the first probability. For example, if the modification factor is 1.25 and the first probability is 0.5, the viewership forecasting application may determine that the modified probability is 0.625 (i.e., 1.25 multiplied by 0.5). The viewership forecasting application may identify the user associated with the first probability and store the value of 0.625 and a user identifier associated with the user in a data structure generated for the metric.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows an illustrative example of a data structure that may store a received plurality of probabilities and a modified plurality of probabilities in accordance with some embodiments of the disclosure;

DETAILED DESCRIPTION

Figure 2:
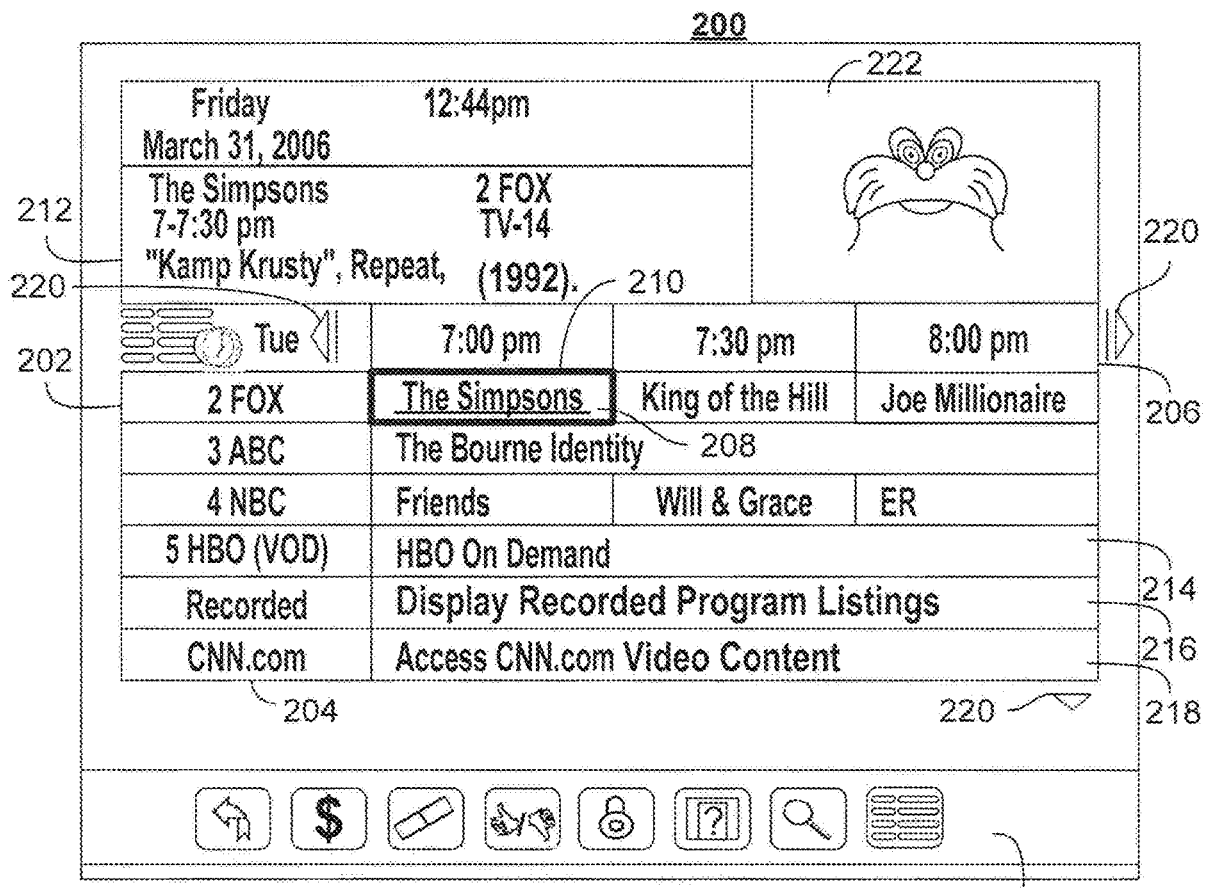
FIG. 2 shows an illustrative example of a display screen for use in accessing media content in accordance with some embodiments of the disclosure.

Systems and methods are disclosed herein for generating consumption probability metrics for media assets. A viewership forecasting application may be used to execute the actions discussed herein. The viewership forecasting application may run on one or more hardware devices that include control circuitry (e.g., servers, user equipment devices, or a combination of the two types of devices). In some embodiments, the viewership forecasting application may interface with a media guidance application on user devices and server devices.

A consumption probability metric may be generated for a media asset. A first value representing a first number of users that are predicted to consume a media asset is received, the value being a portion of a total number of users (e.g., aggregated forecast). A plurality of probabilities, each corresponding to a user of a plurality of users, is received, each of the received probabilities indicating how likely a respective user is to consume the media asset. A weight for the plurality of users is calculated, the weight representing a ratio of the total number of users to a number of users in the plurality of users. A second value representing a second number of users that are predicted to consume the media asset is determined (disaggregated forecast) based on (1) the weight for the plurality of users and (2) the plurality of probabilities. A modification factor is computed based on the first number of users and the second number of users. A metric is generated that includes (1) a plurality of user identifiers associated with the plurality of users and (2) a plurality of modified probabilities, each modified probability of the plurality of modified probabilities is modified by the modification factor.

In some embodiments, the viewership forecasting application may receive a prediction of a number of users that will consume a media asset (e.g., from a total population of households that are monitored for media consumption activity). Specifically, the viewership forecasting application may receive a first number of users that are predicted to consume a media asset, where the first number of users is a portion of a total number of users. For example, the viewership forecasting application may transmit a request to a provider for the prediction. The request may include the media asset identifier of the media asset.

The viewership forecasting application may have access to one or more sources of information that includes a plurality of user profiles associated with a plurality of users, respectively. The user profile information may include user preference information that may be used to determine a probability that a particular user will consume a particular media asset. The viewership forecasting application may retrieve the probabilities. Specifically, the viewership forecasting application may retrieve a plurality of probabilities, each corresponding to a user in a plurality of users, where each probability indicates how likely a respective user is to consume the media asset. For example, the viewership forecasting application may transmit, to a server, a request that includes the media asset identifier, requesting a probability that each user will consume the media asset associated with the media asset identifier. The provider may calculate the probability based on the user profiles and transmit to the viewership forecasting application those probabilities.

In some embodiments, the viewership forecasting application may retrieve the user profiles and calculate the probabilities based on those profiles. The viewership forecasting application may transmit a request to a user profile provider for anonymized user profile information and calculate, based on the received profile information, respective probabilities of how likely each respective user is to consume the media asset. The viewership forecasting application may store the received or calculated probabilities in data structure 100 (FIG. 1). Each field 102 (FIG. 1) may include a user identifier associated with a corresponding profile, and each field 104 (FIG. 1) may include the probability associated with that user identifier. Although data structure 100 stores each probability as a number between one and zero, it should be noted that the probability may be stored as a fraction, a percentage, or any other suitable indication.

The viewership forecasting application may calculate a weight for the plurality of users based on the ratio of the number of users in the plurality of users to the total number of users (e.g., a total population of households that are monitored for media consumption activity). Specifically, the viewership forecasting application may calculate a weight for the plurality of users, where the weight represents a ratio of the total number of users to a number of users in the plurality of users. For example, the viewership forecasting application may divide the total number of users by the plurality of users to determine the weight.

The viewership forecasting application may determine a second number of users that are predicted to consume the media asset (i.e., disaggregated forecast). The viewership forecasting application may use the weight for the plurality of users, the number of users in the first plurality of users, and the plurality of probabilities to make the determination. Specifically, the viewership forecasting application may determine, based on (1) the weight for the plurality of users and (2) the plurality of probabilities, a second number of users that are predicted to consume the media asset. For example, the viewership forecasting application may initialize a variable for a sum of the plurality of probabilities. The viewership forecasting application may iterate through each user in the plurality of users and retrieve for each user a corresponding probability. The viewership forecasting application may add, at each iteration, the corresponding probability to the variable for the sum. The viewership forecasting application may determine the product of the sum and weight for the plurality of users to arrive at the second number of users. The calculation may be represented by the following equation:

$$\tilde{A}_t = \sum_i w_i P_{it} \qquad \text{Equation 1}$$

where parameters of equation 1 are defined as follows:
$\tilde{A}_t$ a number of users predicted to consume media asset t
$w_i$ weight of each user i
$P_{it}$ probability that each user i will consume media asset t.

The viewership forecasting application may compute a ratio between the first number of users and the second number of users, thereby identifying a ratio of the aggregated forecast to the disaggregated forecast. Specifically, the viewership forecasting application may compute, based on the first number of users and the second number of users, a modification factor for the first media asset. For example, the viewership forecasting application may divide the first number of users by the second number of users. The calculation may be represented by the following equation:

$$\lambda_t = A_t / \tilde{A}_t \qquad \text{Equation 2}$$

where parameters of equation 2 are defined as follows:
$\lambda_t$ modification factor for title t
$A_t$ a prediction of a number of users that will consume media asset t as received (aggregated forecast)
$\tilde{A}_t$ a number of users predicted to consume a media asset calculated in Equation 1 (disaggregated forecast).

The viewership forecasting application may generate a metric based on the plurality of probabilities using the modification factor. Specifically, the viewership forecasting application may generate, for the media asset, a metric comprising (1) a plurality of user identifiers associated with the plurality of users and (2) a plurality of modified probabilities, where each modified probability of the plurality of modified probabilities is modified by the modification factor. For example, the viewership forecasting application may iterate through each user 102 in data structure 100 and for each user 102 retrieve probability 104. The viewership forecasting application may calculate a product of the retrieved probability and the modification factor. The viewership forecasting application may store a user identifier (e.g., user identifier 152) and the resulting product (e.g., probability 154) in data structure (150) corresponding to the metric.

The generated metric may be referred to as a consumption probability metric. The modification of each probability may be represented by the following equation:

$$\pi_{it} = \lambda_t p_{it} \qquad \text{Equation 3}$$

where parameters of equation 3 are defined as follows:
$\pi_{it}$ probability modified by the modification factor that user i will consume title t
$\lambda_t$ modification factor for title t
$p_{it}$ retrieved probability that user i will consume title t.

It should be noted that the viewership forecasting application may perform an error check on the calculations in Equation 1, Equation 2, and Equation 3 by the following equation:

$$A_t \equiv \sum_i w_i \pi_{it} \quad \text{Equation 4}$$

where parameters of equation 4 are defined as follows:
$\lambda_{it}$ probability modified by the modification factor that user i will consume title t
$w_i$ weight of each user i
$A_t$ a prediction of a number of users that will consume media asset t as received (aggregated forecast).

In some embodiments, the viewership forecasting application may use the generated consumption probability metric to forecast viewership of a cross-section of users. Specifically, the viewership forecasting application may receive a characteristic associated with a group of users. The viewership forecasting application may compare the characteristic with each of a plurality of profiles associated with the plurality of users and select, based on the comparing, a set of user identifiers from the plurality of user identifiers corresponding to those profiles that match the characteristic. The viewership forecasting application may determine, using a portion of the metric associated with the set of user identifiers, an amount of users that are likely to consume the media asset.

The calculation may be represented by the following equation:

$$A_{t,tgt} = \sum_{i \in tgt} w_i \pi_{it} \quad \text{Equation 5}$$

where parameters of equation 5 are defined as follows:
$\pi_{it}$ probability modified by the modification factor that user i will consume title t
$w_1$ weight of each user i
$A_{t,tgt}$ a prediction of a number of users with a particular characteristic of preference that will consume media asset t.

For example, the viewership forecasting application may receive a text string as a characteristic (e.g., chocolate). The viewership forecasting application may iterate through each user profile and compare the text of the string with data stored in each user profile. The viewership consumption application may store, in a data structure, an identifier associated with each profile that matches the characteristic. The viewership forecasting application may iterate through each identifier corresponding to a matching profile (e.g., a user identifier 152) and retrieve a modified probability (e.g., a probability 154) associated with that identifier. The viewership forecasting application may add all the probabilities for the matching profiles and multiply the result by the weight in order to determine a cross-section of users that are predicted to consume a media asset.

In some embodiments, the viewership forecasting application may determine the amount of users that are likely to consume the media asset using the following actions. The viewership forecasting application may retrieve (e.g., from data structure 150) the appropriate modified probabilities (e.g., probabilities 154), calculate a sum of modified probabilities that are associated with the portion of the user metric and multiply the sum by the weight. For example, if there are five users in the plurality of users with the modified probabilities of 0.6, 0.7, 0.4, 0.3, and 0.5 and the weight of each user is twenty million, the viewership forecasting application may calculate a sum of all the probabilities (i.e., 2.5) and multiple the sum by the weight (i.e., 25 million) to arrive at the result of 62.5 million users.

In some embodiments, the viewership forecasting application may determine a number of unique users that are likely to consume an advertisement associated with a specific advertiser using the generated consumption probability metric. Specifically, the viewership forecasting application may receive, from an advertiser, a value representing a number of advertisements associated with the advertiser that are to be played during presentation of the media asset and determine, based on (1) the value representing the number of advertisements and (2) the plurality of modified probabilities and (3) the weight, a number of unique users that are likely to consume any advertisement that is both (1) associated with the advertiser and (2) is to be played during the presentation of the media asset.

For example, for each user, the viewership forecasting application may retrieve a first modified probability (e.g., a probability 154) and subtract that number from one. The result of the subtraction operation is stored in a variable and is raised to the power equal to the number of advertisements associated with the advertisers that are run during the media asset. The viewership forecasting application may store the resulting value in a variable. This value is subtracted from one. These actions determine a probability that a user consumed at least one advertisement associated with the advertiser that ran during the media asset. The viewership forecasting application may multiply the resulting probability by the weight to determine the probability that a unique user will consume at least one advertisement run within the media asset considered in the calculation. The viewership forecasting application may make a similar determination for all users that are being considered and calculate a sum of the result to determine how many unique users are predicted to consume an advertisement (i.e., determine reach).

It should be noted that these values may be calculated over a plurality of media assets (e.g., media assets in an advertising campaign). The calculation may be represented by the following equation:

$$R = \sum_i w_i \left[ 1 - \prod_{t \in C} (1 - \pi_{it})^n \right] \quad \text{Equation 6}$$

where parameters of equation 6 are defined as follows:
R a number of unique users predicted to consume at least one title t in the advertising campaign C
$\pi_{it}$ probability modified by the modification factor that user i will consume title t
$w_i$ weight of each user i
$\pi_{it}$ probability modified by the modification factor that user i will consume title t.

In some embodiments, the viewership forecasting application may determine the average number of advertisement exposures per user. Specifically, the viewership forecasting application may determine, based on the total number of users and the number of unique users that are likely to consume any advertisement associated with the advertiser, a number of times that each user consumed an advertisement that is associated with the advertiser. For example, the viewership forecasting application may calculate the number of times on average each user consumed an advertisement by dividing a total number of users that consumed the advertisement by the number of unique users that consumed the advertisement. The calculation may be represented by the following equation:

$$f = \frac{\sum_{t \in C} A_t}{R} \quad \text{Equation 7}$$

where parameters of equation 7 are defined as follows:
R a number of unique users predicted to consume at least one title t in the advertising campaign C
$A_t$ a prediction of a number of users that will consume media asset t as received (aggregated forecast)
f an average number of times (frequency) a user saw each of titles t that are part of the advertising campaign c.

In some embodiments, the viewership forecasting application may receive the first number of users that are predicted to consume the media asset with the following actions. The viewership forecasting application may receive a media asset identifier associated with the media asset. The viewership forecasting application may transmit, to an audience measurement provider, a request for the first number of users that are predicted to consume the media asset, where the request includes the media asset identifier and receive, in response to the request, the first number of users that are predicted to consume the media asset. For example, a user may provider the viewership forecasting application with a media asset identifier for consumption probability metric generation. The viewership forecasting application may transmit the media asset identifier to an audio measurement service and receive back a number of users predicted to consume the media asset associated with the media asset identifier.

The viewership forecasting application may receive the plurality of probabilities with the following actions. The viewership forecasting application may select a service that stores a plurality of profiles associated with the plurality of users and transmit, to a profile server associated with the service, a request for the plurality of probabilities, the request including the media asset identifier. The viewership forecasting application may receive, in response to the request, the plurality of probabilities. The viewership forecasting application may store the received information in a data structure with multiple fields. For example, the fields may be designed to accommodate the different types of information in the profiles. The viewership forecasting application may select a provider based on a number of users for which profiles exist, the amount of data in those profiles, or another suitable criterion. In some embodiments, the viewership forecasting application may select multiple providers. The viewership forecasting application may transmit a request for the plurality of probabilities.

For example, the viewership forecasting application may transmit a media asset identifier associated with the media asset requesting probability for each user consuming the media asset and receive in response the appropriate probabilities. In some embodiments, the viewership forecasting application may receive a plurality of user profiles and based on an algorithm determine a probability of each user associated with a corresponding profile consuming the media asset.

In some embodiments, the viewership forecasting application may determine, based on (1) the weight for the plurality of users and (2) the plurality of probabilities, the second number of users that are predicted to consume the media asset with the following actions. The viewership forecasting application may compute a sum of the plurality of probabilities and multiply the sum of the plurality of probabilities by the weight.

In some embodiments, the viewership forecasting application may compute the modification factor for the first media asset by dividing the first number of users by the second number of users. For example, if a Nielsen rating for a media asset is predicted to be twenty million users of one hundred million users (aggregated forecast) and the number of users determined from the plurality of probabilities is twenty-five million users, the modification factor may be calculated as twenty-five million divided by twenty million (i.e., 1.25).

In some embodiments, the viewership forecasting application may generate, for the media asset, the metric comprising (1) a plurality of user identifiers associated with the plurality of users and (2) a plurality of modified probabilities with the following actions. The viewership forecasting application may select a first probability of the plurality of probabilities and compute a product of the first probability and the modification factor. The viewership forecasting application may store, in a data structure associated with the metric, the product of the first probability and the modification factor and the user identifier associated with the first probability.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 3:
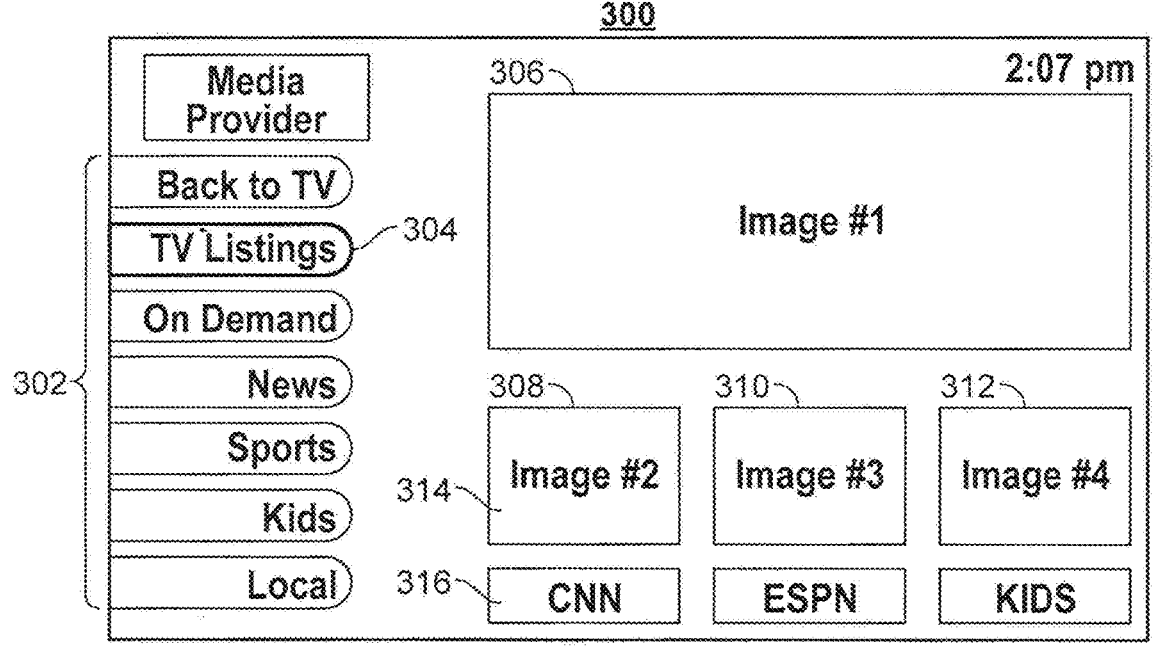
FIG. 3 shows another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
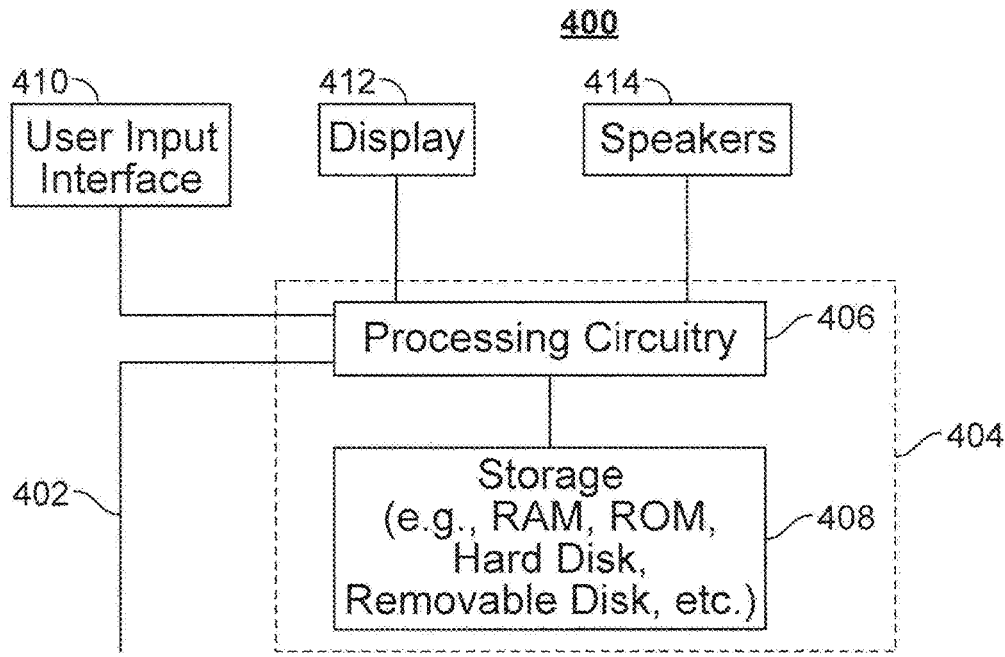
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
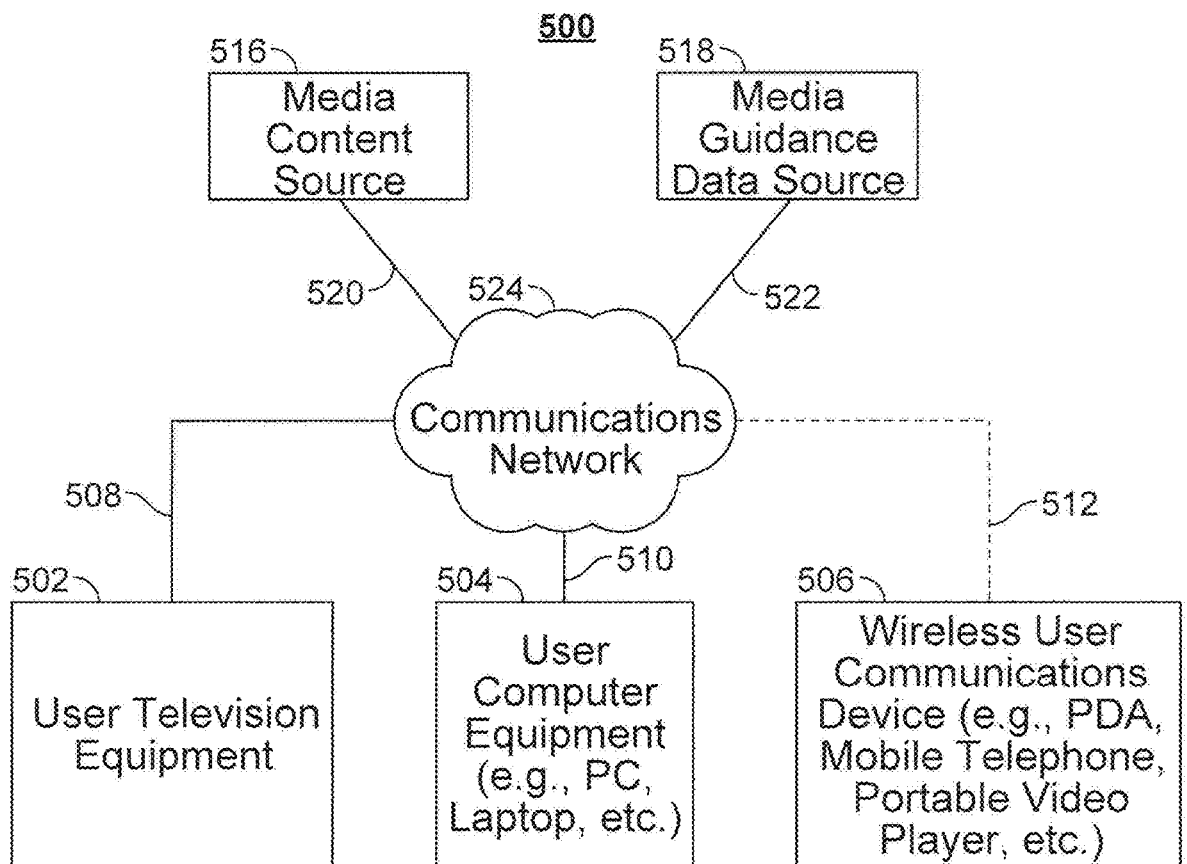
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

It should be noted that the viewership forecasting application may be executed on any of user device 502, 504, and/or 506. The viewership forecasting application may also be executed on a server (e.g., media content source 516 and/or media guidance data source 518). The viewership forecasting application may be executed using control circuitry 404.

Figure 6:
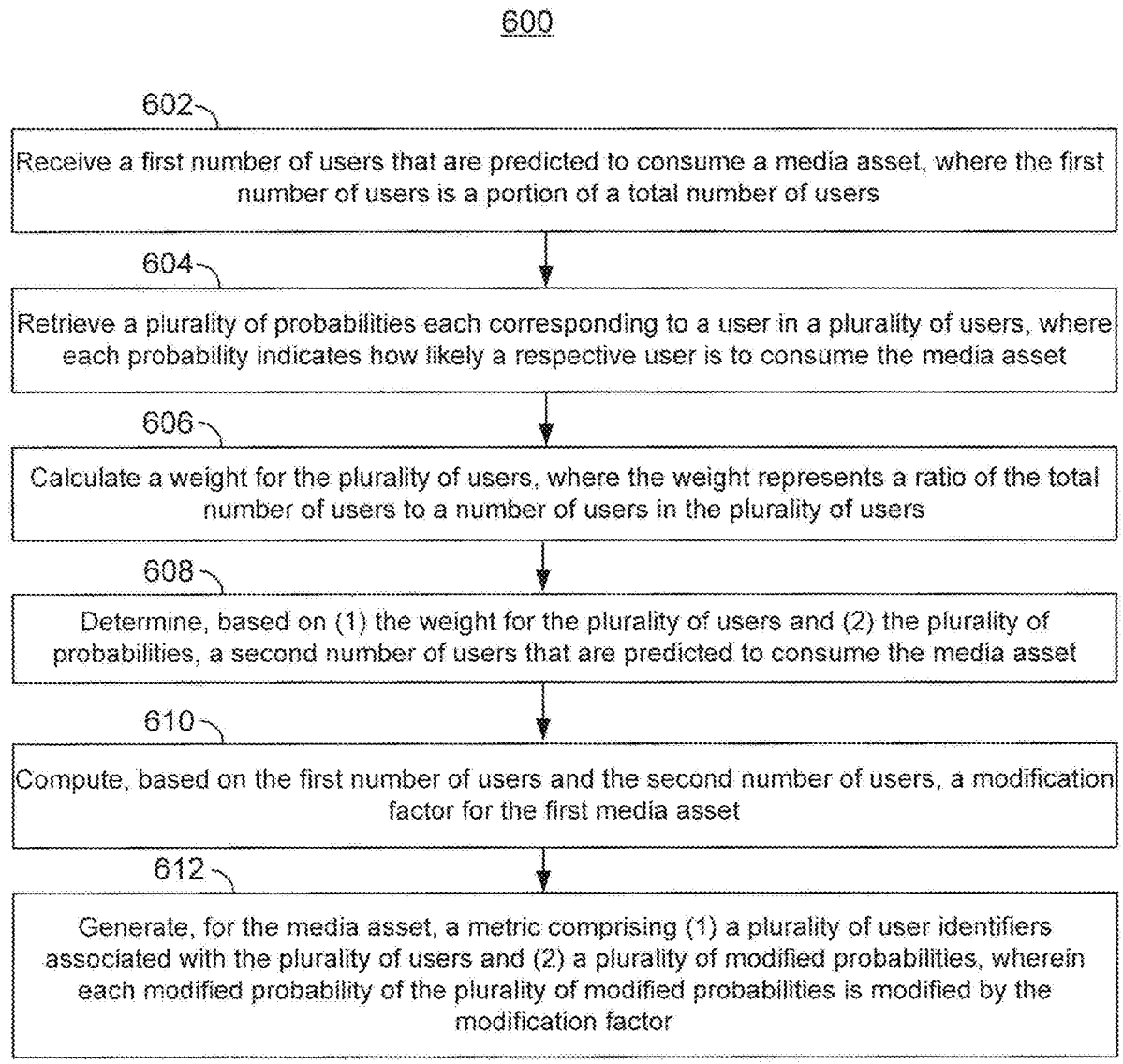
FIG. 6 is a flowchart of illustrative actions for generating a consumption probability metric for a media asset in accordance with some embodiments of the disclosure.

FIG. 6 is a flowchart of illustrative actions for generating a consumption probability metric for a media asset. At 602, control circuitry 404 receives a first number of users that are predicted to consume a media asset, where the first number of users is a portion of a total number of users. For example, the control circuitry may receive the first number of users via I/O path 402 and store the received first number in storage 408.

At 604, control circuitry 404 retrieves a plurality of probabilities, each corresponding to a user in a plurality of users, where each probability indicates how likely a respective user is to consume the media asset. For example, the control circuitry may transmit a request via I/O path 402 and receive the plurality of probabilities via I/O path 402 from a remote server (e.g., media content source 516 and/or media guidance data source 518). It should be noted that in some embodiments control circuitry 404 may reside on a server (e.g., media content source 516 and/or media guidance data source 518) and receive that plurality of probabilities from another remote server.

At 606, control circuitry 404 calculates a weight for the plurality of users, where the weight represents a ratio of the total number of users to a number of users in the plurality of users. For example, the control circuitry may perform a mathematical operation to perform the calculation. At 608, control circuitry 404 determines, based on (1) the weight for the plurality of users and (2) the plurality of probabilities, a second number of users that are predicted to consume the media asset. For example, the control circuitry may perform a mathematical operation to complete the calculation.

At 610, control circuitry 404 computes, based on the first number of users and the second number of users, a modification factor for the first media asset. For example, the control circuitry may perform a mathematical operation to complete the calculation.

At 612, control circuitry 404 generates, for the media asset, a metric comprising (1) a plurality of user identifiers associated with the plurality of users and (2) a plurality of modified probabilities, wherein each modified probability of the plurality of modified probabilities is modified by the modification factor. For example, the control circuitry may iterate through each probability and apply the modification factor. The result may be stored in storage 408. In some embodiments, the result may be stored at a remote server (e.g., media content source 516 and/or media guidance data source 518).

Figure 7:
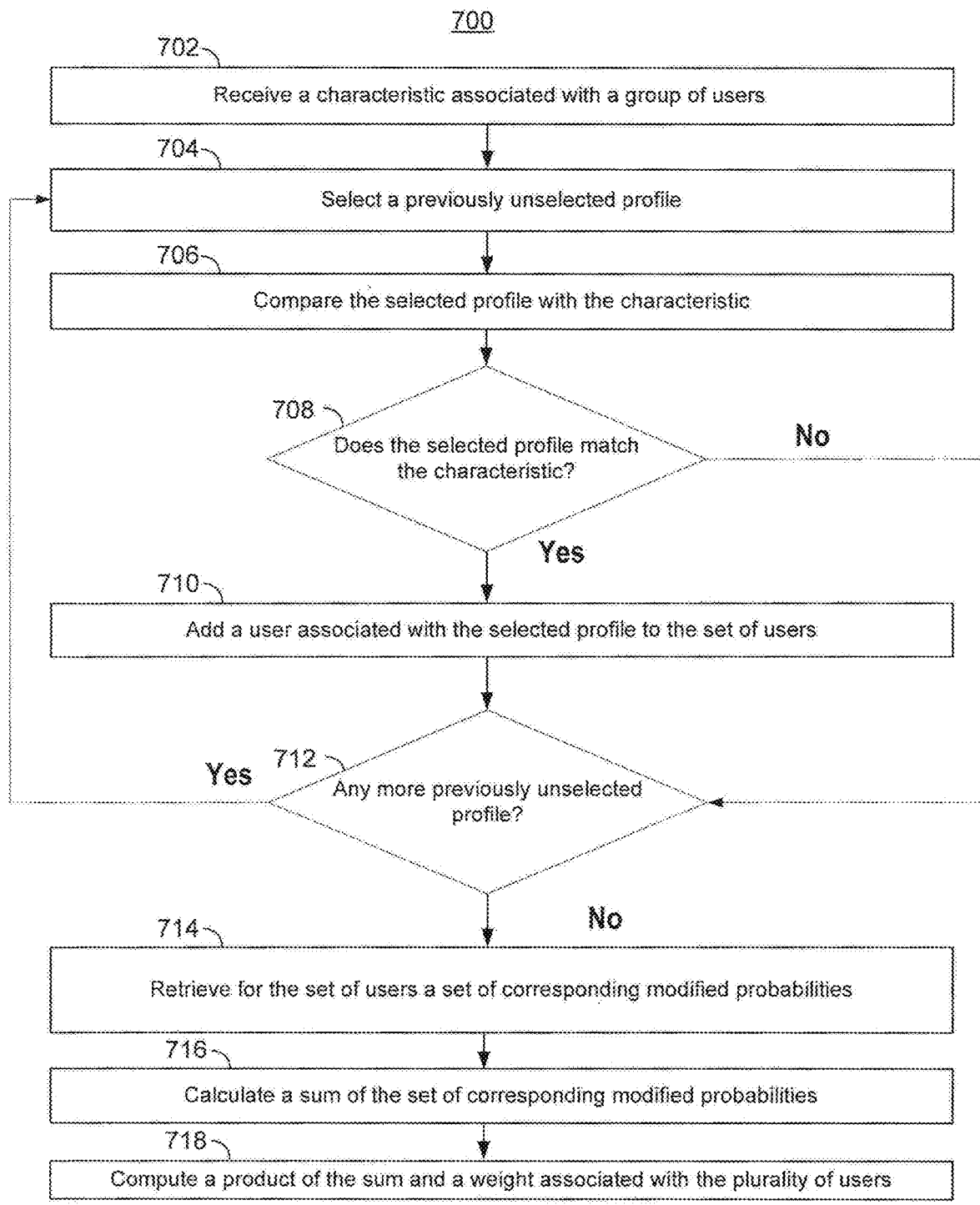
FIG. 7 is a flowchart of illustrative actions for using a consumption probability metric to determine a number of users associated with a characteristic that are predicted to consume a media asset in accordance with some embodiments of the disclosure.

FIG. 7 is a flowchart of illustrative actions for using a consumption probability metric to determine a number of users associated with a characteristic that are predicted to consume a media asset. At 702, control circuitry 404 receives a characteristic associated with a group of users. The control circuitry may receive the characteristic via I/O path 402 of FIG. 4. In some embodiments, the control circuitry may receive the characteristic via user input interface 410 (FIG. 4). The characteristic may be one or more of text, image, sound (e.g., voice input) or a combination of these.

At 704, control circuitry 404 selects a previously unselected profile. For example, a data structure containing a plurality of profiles for a plurality of users may be stored in storage 408. The control circuitry may access the data structure and iterate through the profiles in the data structure to select previously unselected profiles. In some embodiments, the profiles may be stored in a database on a remote server and the control circuitry may select the profiles by transmitting a database query to the server for the user identifiers associated with the profiles, and, using the user identifiers, request (e.g., through I/O path 402 via communications network 524) the selected profile. The control circuitry may store the received profile in a data structure in storage 408.

At 706, control circuitry 404 compares the selected profile with the characteristic. The control circuitry may execute a textual comparison (e.g., string comparison) between the characteristic and any text in the selected profile. In some embodiments, the control circuitry may include synonyms of the characteristic with the profile. The control circuitry may retrieve the synonyms from any dictionary or thesaurus service.

At 708, control circuitry 404 determines whether the selected profile matches the characteristic. For example, the control circuitry may determine a match if at least one word in the user profile matches the characteristic. In some embodiments, the control circuitry may determine a match if a synonym of the characteristic matches a word in the user profile. If control circuitry 404 determines that the selected profile matches the characteristic, process 700 moves to 710. At 710, control circuitry 404 adds a user associated with the selected profile to the set of users. For example, the control circuitry may store (e.g., in storage 408) a data containing user identifiers corresponding to user that match the characteristic. The control circuitry may add a user identifier corresponding to the selected user to the data structure.

If control circuitry 404 determines that the selected profile does not match the characteristic, process 700 moves to 712. At 712, control circuitry 404 determines whether there are any more previously unselected profiles. For example, if the control circuitry is iterating through all the profiles in the data structure, the control circuitry may determine if it is at the end of the data structure. Additionally or alternatively, the control circuitry may be iterating through the data structure using a looping mechanism where the loop ends when the last profile is selected. If control circuitry 404 determines that there are more previously unselected profiles, process 700 moves to 704. If control circuitry 404 determines that there are no more previously unselected profiles, process 700 moves to 714.

At 714, control circuitry 404 retrieves for the set of users a set of corresponding modified probabilities. To continue with the above example, if the control circuitry has stored a data structure that includes a user identifier corresponding to user profiles that match the characteristic, the control circuitry may access the data structure (e.g., in storage 408) and retrieve from the data structure the corresponding modified probabilities.

At 716, control circuitry 404 calculates a sum of the set of corresponding modified probabilities. For example, the control circuitry may create a variable that is to store the sum of the modified probabilities retrieved in 714. At 718, control circuitry 404 computes a product of the sum and a weight associated with the plurality of users. The control circuitry may execute a mathematical multiplication function to perform the calculation.

Figure 8:
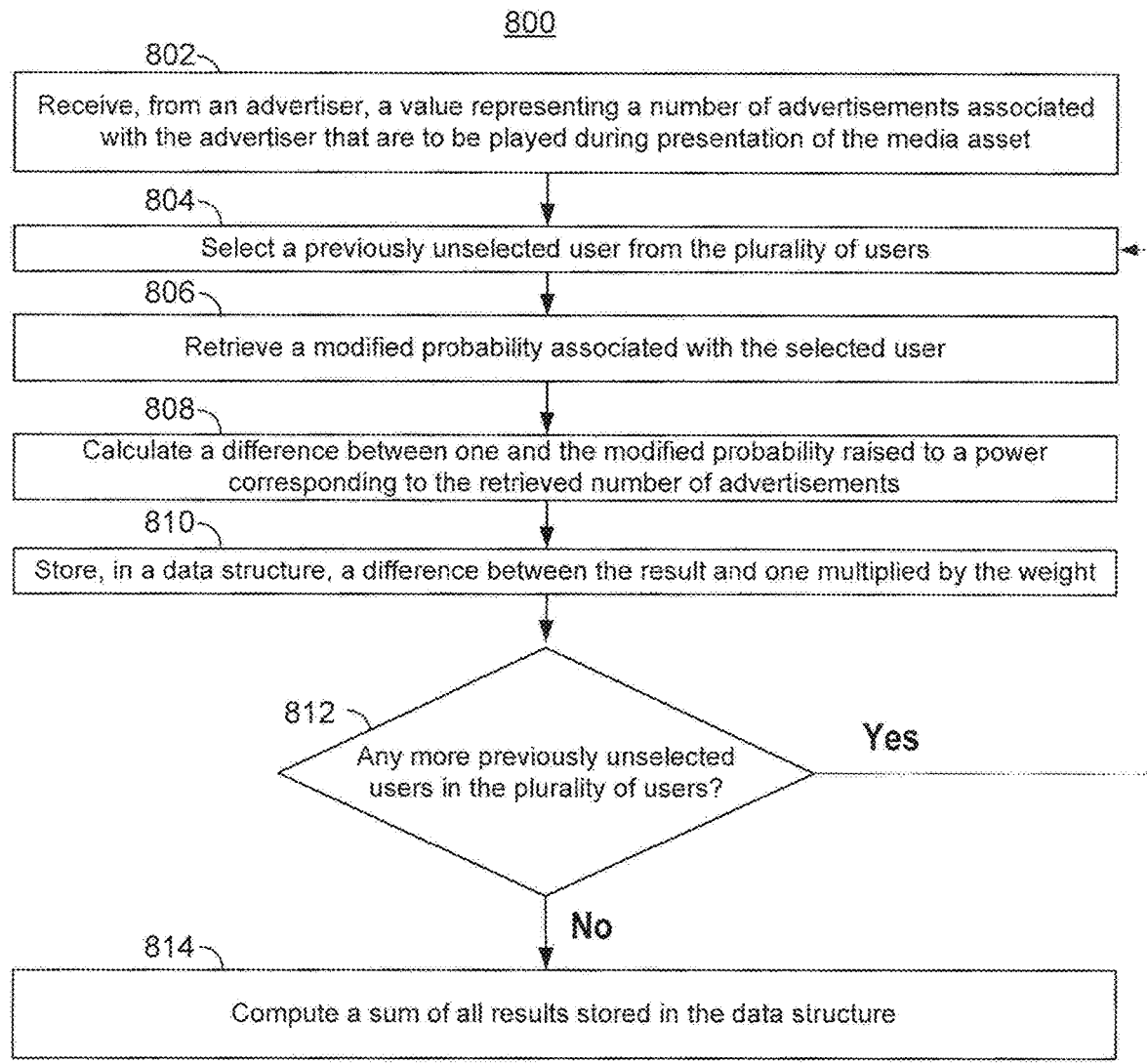
FIG. 8 is a flowchart of illustrative actions for using a consumption probability metric to determine a unique reach for one or more advertisements within a media asset in accordance with some embodiments of the disclosure.

FIG. 8 is a flowchart of illustrative actions for using a consumption probability metric to determine a unique reach for one or more advertisements within a media asset. At 802, control circuitry 404 receives, from an advertiser, a value representing a number of advertisements associated with the advertiser that are to be played during presentation of the media asset. For example, the control circuitry may receive the value via I/O path 402. In some embodiments, the control circuitry may receive the value via user input interface 410.

At 804, control circuitry 404 selects a previously unselected user from the plurality of users. For example, the control circuitry may be iterating through all the users in the plurality of users. The plurality of users may be stored in a data structure (e.g., in storage 408). The control circuitry may determine if it is at the end of the data structure. Additionally or alternatively, the control circuitry may be iterating through the data structure using a looping mechanism where the loop ends when the last user is selected.

At 806, control circuitry 404 retrieves a modified probability associated with the selected user. For example, the control circuitry may access the data structure associated with the user and retrieve the corresponding probability. If the data structure is located at a remote server, the control circuitry may transmit a request to the remote server for the probability and receive the probability in response.

At 808, control circuitry 404 calculates a difference between one and the modified probability raised to a power corresponding to the retrieved number of advertisements. For example, the control circuitry may use a mathematical function to make the calculations. At 810, control circuitry 404 stores, in a data structure, a difference between the result and one multiplied by the weight. For example, the control circuitry may make the calculation and store the result in a variable (e.g., in storage 408).

At 810, control circuitry 404 determines whether there are any more previously unselected users in the plurality of users. If control circuitry 404 determines that there are more previously unselected users in the plurality of users, process 800 moves to 804. If control circuitry 404 determines that there are no more previously unselected users in the plurality of users, process 800 moves to 814. At 814, control circuitry 404 computes a sum of all results stored in the data structure. For example, the control circuitry may execute an addition operation on the results.

It is contemplated that the steps or descriptions of each of FIGS. 6-8 may be used with any other embodiment of this disclosure. In addition, the steps and descriptions described in relation to FIGS. 6-8 may be done in alternative orders or in parallel to further the purposes of this disclosure. For example, each of these actions may be performed in any order or in parallel or substantially simultaneously to reduce lag or increase the speed of the system or method. Furthermore, it should be noted that any of the devices or equipment discussed in relation to FIGS. 4-5 may be used to perform one or more of the steps in FIGS. 6-8.

While some portions of this disclosure may make reference to "convention," any such reference is merely for the purpose of providing context to the invention(s) of the instant disclosure, and does not form any admission as to what constitutes the state of the art.

The processes discussed above are intended to be illustrative and not limiting. One skilled in the art would appreciate that the actions of the processes discussed herein may be omitted, modified, combined, and/or rearranged, and any additional actions may be performed without departing from the scope of the disclosure. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving an aggregated forecast value, wherein the aggregated forecast value indicates a first number of users, of a total number of users, that are predicted to consume electronic content;
   accessing a data structure having stored therein a plurality of user profiles each corresponding to a user of a plurality of users;
   retrieving, from the data structure, a plurality of probabilities, wherein each of the plurality of probabilities:
   is stored in a respective user profile of the plurality of user profiles;
   and indicates how likely a respective user is to consume the electronic content;
   using control circuitry, modifying each of the plurality of probabilities at least in part according to the aggregated forecast value and a ratio of the total number of users and a number of users of the plurality of users for each probability;
   storing, in each of the plurality of user profiles in the data structure, a modified probability, of the modified plurality of probabilities, that corresponds to the respective user profile;
   iterating through each user profile of the plurality of user profiles and comparing a characteristic with information stored in each user profile;
   storing, in the data structure, an identifier associated with each user profile of the plurality of user profiles that matches the characteristic based on the comparison of the characteristic with the information stored in each user profile;
   retrieving, from user profiles having the associated identifier of the plurality of user profiles, a subset of the modified plurality of probabilities corresponding to a subset of users, of the plurality of users, that share the characteristic; and
   using control circuitry, determining, from the subset of the modified plurality of probabilities, a second number of users that are likely to consume the electronic content.

2. The method of claim 1, further comprising inserting supplemental content into the electronic content based on the second number of users.

3. The method of claim 2, further comprising generating for display, the electronic content with the inserted supplemental content.

4. The method of claim 1, wherein the modifying further comprises:
   determining, based on (1) the ratio of the total number of users and the number of users in the plurality of users and (2) the probabilities, a disaggregated forecast value, wherein the disaggregated forecast value indicates a third number of users that are predicted to consume the electronic content;
   computing, based on the aggregated forecast value and the disaggregated forecast value, a modification factor for the electronic content; and
   generating, for the electronic content, the modified plurality of probabilities by multiplying each of probability of the plurality of probabilities by the modification factor.

5. The method of claim 4, wherein determining the second number of users further comprises:
   calculating a sum of the subset of the modified plurality of probabilities; and
   multiplying the sum by the ratio of the total number of users and the number of users in the plurality of users.

6. The method of claim 1, further comprising:
   receiving, from an advertiser, a value representing a number of advertisements associated with the advertiser that are to be played during presentation of the electronic content;

determining, based at least in part on (1) the value representing the number of advertisements and (2) the modified plurality of probabilities, a number of unique users that are likely to consume any advertisement that is both (1) associated with the advertiser and (2) is to be played during the presentation of the electronic content; and determining, based on the total number of users and the number of unique users that are likely to consume any advertisement associated with the advertiser, a number of times that each user consumed an advertisement that is associated with the advertiser.

7. The method of claim 1, wherein receiving the aggregated forecast value comprises:

receiving a content identifier associated with the electronic content;

transmitting, to an audience measurement provider, a request for the aggregated forecast value, wherein the request includes the content identifier; and receiving, in response to the request, the aggregated forecast value.

8. The method of claim 1, further comprising:

selecting a service that stores the plurality of user profiles;

transmitting, to a profile server associated with the service, a request for the plurality of probabilities, wherein the request includes a content identifier associated with the electronic content;

receiving, in response to the request, the plurality of probabilities; and storing, in the data structure, the plurality of probabilities.

9. The method of claim 4, wherein the determining the disaggregated forecast value comprises:

computing a sum of the plurality of probabilities; and multiplying the sum of the plurality of probabilities by the ratio of the total number of users and the number of users in the plurality of users.

10. The method of claim 4, wherein computing the modification factor for the electronic content comprises dividing the aggregated forecast value by the disaggregated forecast value.

11. A system comprising:

a storage device configured to store a data structure comprising a plurality of user profiles each corresponding to a user of a plurality of users; and control circuitry configured to:

receive an aggregated forecast value, wherein the aggregated forecast value indicates a first number of users, of a total number of users, that are predicted to consume electronic content;

access the storage device and retrieve, from the data structure, a plurality of probabilities, wherein each of the plurality of probabilities:

is stored in a respective user profile of the plurality of user profiles;

and indicates how likely a respective user is to consume the electronic content;

modify each of the plurality of probabilities at least in part according to the aggregated forecast value and a ratio of the total number of users and a number of users of the plurality of users for each probability;

control the storage device to store, in each of the plurality of user profiles in the data structure, a modified probability, of the modified plurality of probabilities, that corresponds to the respective user profile;

iterate through each user profile of the plurality of user profiles and compare a characteristic with information stored in each user profile;

control the storage device to store, in the data structure, an identifier associated with each user profile of the plurality of user profiles that matches the characteristic based on the comparison of the characteristic with the information stored in each user profile;

retrieve, from user profiles having the associated identifier of the plurality of user profiles, a subset of the modified plurality of probabilities corresponding to a subset of users, of the plurality of users, that share the characteristic; and determine, from the subset of the modified plurality of probabilities, a second number of users that are likely to consume the electronic content.

12. The system of claim 11, wherein the control circuitry is further configured to insert supplemental content into the electronic content based on the second number of users.

13. The system of claim 12, wherein the control circuitry is further configured to generate for display, the electronic content with the inserted supplemental content.

14. The system of claim 11, wherein the control circuitry is configured to modify each of the plurality of probabilities by:

determining, based on (1) the ratio of the total number of users and the number of users in the plurality of users and (2) the probabilities, a disaggregated forecast value, wherein the disaggregated forecast value indicates a third number of users that are predicted to consume the electronic content;

computing, based on the aggregated forecast value and the disaggregated forecast value, a modification factor for the electronic content; and generating, for the electronic content, the modified plurality of probabilities by multiplying each of probability of the plurality of probabilities by the modification factor.

15. The system of claim 14, wherein the control circuitry is configured to determine the second number of users by:

calculating a sum of the subset of the modified plurality of probabilities; and multiplying the sum by the ratio of the total number of users and the number of users in the plurality of users.

16. The system of claim 11, wherein the control circuitry is further configured to:

receive, from an advertiser, a value representing a number of advertisements associated with the advertiser that are to be played during presentation of the electronic content;

determine, based at least in part on (1) the value representing the number of advertisements and (2) the modified plurality of probabilities, a number of unique users that are likely to consume any advertisement that is both (1) associated with the advertiser and (2) is to be played during the presentation of the electronic content; and determine, based on the total number of users and the number of unique users that are likely to consume any advertisement associated with the advertiser, a number of times that each user consumed an advertisement that is associated with the advertiser.

17. The system of claim 11, wherein the control circuitry is configured to receive the aggregated forecast value by:

receiving a content identifier associated with the electronic content;

transmitting, to an audience measurement provider, a request for the aggregated forecast value, wherein the request includes the content identifier; and receiving, in response to the request, the aggregated forecast value.

18. The system of claim 11, wherein the control circuitry is further configured to:

select a service that stores the plurality of user profiles;

transmit, to a profile server associated with the service, a request for the plurality of probabilities, wherein the request includes a content identifier associated with the electronic content;

receive, in response to the request, the plurality of probabilities; and control the storage device to store, in the data structure, the plurality of probabilities.

19. The system of claim 14, wherein the control circuitry is configured to determine the disaggregated forecast value by:

computing a sum of the plurality of probabilities; and multiplying the sum of the plurality of probabilities by the ratio of the total number of users and the number of users in the plurality of users.

20. The system of claim 14, wherein the control circuitry is configured to compute the modification factor for the electronic content by dividing the aggregated forecast value by the disaggregated forecast value.

* * * * *